United States Patent
Iguchi et al.

(10) Patent No.: US 8,132,989 B2
(45) Date of Patent: Mar. 13, 2012

(54) DRILL

(75) Inventors: Takahiro Iguchi, Toyokawa (JP);
Takayuki Nakajima, Toyokawa (JP)

(73) Assignee: OSG Corporation, Aichi (JP)

( * ) Notice: Subject to any disclaimer, the term of this patent is extended or adjusted under 35 U.S.C. 154(b) by 524 days.

(21) Appl. No.: 12/226,254

(22) PCT Filed: Oct. 23, 2006

(86) PCT No.: PCT/JP2006/321073
§ 371 (c)(1),
(2), (4) Date: Oct. 10, 2008

(87) PCT Pub. No.: WO2008/050389
PCT Pub. Date: May 2, 2008

(65) Prior Publication Data
US 2009/0274528 A1    Nov. 5, 2009

(51) Int. Cl.
*B23B 51/02* (2006.01)

(52) U.S. Cl. ........................ 408/230; 408/227

(58) Field of Classification Search .......... 408/223–225, 408/227, 229, 230; *B23B 51/00, 51/02*
See application file for complete search history.

(56) References Cited

U.S. PATENT DOCUMENTS

| | | | | |
|---|---|---|---|---|
| 5,590,987 A | * | 1/1997 | Bouzounie | 408/230 |
| 6,036,410 A | * | 3/2000 | Shu'ko | 408/230 |
| 6,270,298 B1 | * | 8/2001 | Colvin | 408/227 |
| 2011/0085868 A1 | * | 4/2011 | Harouche | 408/229 |

FOREIGN PATENT DOCUMENTS

| | | | |
|---|---|---|---|
| JP | 62-68213 | | 3/1987 |
| JP | UM 5-29615 | | 4/1993 |
| JP | 06285709 A | * | 10/1994 |
| JP | 06285710 A | * | 10/1994 |
| JP | 07164228 A | * | 6/1995 |
| JP | 10-156613 | | 6/1998 |
| JP | 10315021 A | * | 12/1998 |
| JP | 2000-271811 | | 10/2000 |
| JP | 2002-103123 | | 4/2002 |
| JP | 2004-34202 | | 2/2004 |
| JP | 2007301706 A | * | 11/2007 |
| SU | 1502228 A | * | 8/1989 |

* cited by examiner

*Primary Examiner* — Daniel Howell
(74) *Attorney, Agent, or Firm* — Muramatus & Associates

(57) ABSTRACT

A drill achieves a long tool life while improving a property for discharging chips. The drill includes: a columnar body which is rotated about an axis; a plurality of cutting edges each being formed at a tip end portion of the body; and a plurality of thinning edges each being formed in conjunction with the cutting edge nearer the axis by providing thinnings at the tip end portion of the body. At least one of the plurality of thinning edges is provided with a concave portion that is formed by cutting the thinning edge to be recessed in a semi-circular shape toward the rear side in the rotational direction, and a center of the semicircular-shaped concave portion is provided on a line extended from the tip end portion of the thinning edge when viewed from a tip end direction of the body.

7 Claims, 4 Drawing Sheets

DRILL

TECHNICAL FIELD

The present invention relates to drills, and particularly to a drill in which tool life can be improved while improving the discharging property of chips.

BACKGROUND ART

In order to reduce the cutting resistance at the time of a cutting process, a thinning is generally provided at a tip end portion of a drill such as a twist drill that is disclosed in, for example, Japanese Patent Application Laid-Open No. 2000-271811.

According to the twist drill, the length of a chisel edge can be shortened by providing a thinning 5, and a contact area with a workpiece can be accordingly reduced at the time of the cutting process, which results in reduction of the cutting resistance.

Further, according to the twist drill, a thinning edge 6 is formed by providing the thinning 5, so that the workpiece can be cut by the thinning edge 6 together with a cutting edge 3 at the time of the cutting process.

DISCLOSURE OF THE INVENTION

Problem to be Solved by the Invention

The above-described thinning edges are formed to be tightly packed around an axis portion of the drill. Thus, chips produced at the time of the cutting process are likely to be stuck around the axis portion. In order to prevent the chips from being stuck around the axis portion of the drill, for example, the thinning amount (the amount by which a tip end portion of the drill is cut into the rear side of the drill along the axis direction) of the thinning is increased, thereby improving the discharging property of the chips. However, the increase of the thinning amount results in reduction in strength of the whole drill in this case, and thus the drill is likely to be broken and damaged, leading to reduction in tool life.

The present invention has been achieved to solve the above-described problem, and an object thereof is to provide a drill in which tool life can be improved while improving the discharging property of chips.

Measures for Solving the Problem

For solving the problem, the first aspect of the present invention is a drill comprising: a columnar body which is rotated about an axis; a plurality of cutting edges, each of which is formed at a tip end portion of the body; and a plurality of thinning edges, each of which is formed in conjunction with the cutting edge nearer the axis by providing thinnings at the tip end portion of the body, wherein at least one of the plurality of thinning edges is provided with a concave portion that is formed by cutting the thinning edge to be recessed in a semicircular shape toward the rear side in the rotational direction, and a center of the semicirular-shaped concave portion is provided on a line extended from the tip end portion of the thinning edge when viewed from a tip end direction of the body.

According to the second aspect of the present invention, in addition to the first aspect noted above, the concave portion is provided at an end portion of each thinning edge nearer the axis.

According to the third aspect of the present invention, in addition to the second aspect noted above, the concave portion is provided in contact with a core leaving portion in a circular shape with the axis as its center when viewed from the tip end direction of the body, and the diameter of the core leaving portion is set in a range of not less than 0.030 times and not more than 0.045 times of the outer diameter of the body.

According to the fourth aspect of the present invention, in addition to the first aspect noted above, an inclined angle of each concave portion formed by a wall face of the concave portion on the rear side in the rotational direction and a face orthogonal to the axis is formed substantially the same as a thinning angle formed by the thinning and the face orthogonal to the axis, or formed smaller than the thinning angle.

According to the fourth aspect of the present invention, in addition to the first aspect noted above, three or more cutting edges are provided.

Effect of the Invention

According to the drill in the first aspect of the present invention, at least one of the plurality of thinning edges is provided with the concave portion formed by cutting each thinning edge to be recessed toward the rear side in the rotational direction, so that the chips produced at the time of the cutting process can be accommodated and discharged by the concave portions.

Specifically, since the thinning edges are formed to be tightly packed around the axis portion of the drill, the chips are accommodated and discharged in/from the portions around the axis portion where the chips are likely to be stuck, namely, the concave portions provided at the thinning edges, so that it is possible to advantageously prevent the chips from being stuck around the axis portion and to advantageously improve the discharging property of the chips.

In order to prevent the chips from being stuck around the axis portion of the drill, for example, the thinning amount (the amount by which a tip end portion of the drill is cut into the rear side of the drill along the axis direction) of the thinning is increased, thereby improving the discharging property of the chips. However, the increase of the thinning amount results in reduction in strength of the whole drill in this case, and thus the drill is likely to be broken and damaged, leading to reduction in the tool life.

On the contrary, according to the drill in the invention, since the concave portions are formed by cutting the thinning edges to be recessed, it is possible to advantageously improve the tool life while improving the discharging property of the chips without reduction in strength of the whole drill.

In addition to the effect achieved by the drill in the first aspect noted above, according to the second aspect of the present invention, since each concave portion is provided at the end portion of each thinning edge nearer the axis portion, the chips are effectively prevented from being stuck at the axis portion of the drill, by the concave portions, where the thinning edges are most tightly packed. Accordingly, it is possible to advantageously further improve the discharging property of the chips.

In addition to the effect achieved by the in the second aspect noted above, according to the drill the third aspect of the present invention, each concave portion is provided in contact with a core leaving portion in a circular shape with the axis as its center, when viewed from the tip end direction of the body, and the diameter of the core leaving portion is set in a range of not less than 0.030 times and not more than 0.045 times of the outer diameter of the body. Accordingly, the strength of each thinning edge can be advantageously secured and, at the same time, the cutting resistance can be advantageously reduced.

Specifically, in the case where the diameter of the core leaving portion is smaller than 0.030 times of the outer diameter of the body, each concave portion enters nearer the axis of the drill, resulting in reduction in strength of each thinning edge. On the contrary, by setting the diameter of the core leaving portion at not less than 0.030 times of the outer diameter of the body, each concave portion can be prevented from unnecessarily entering nearer the axis of the drill, so that the strength of each thinning edge can be secured. As a result, the thinning edges can be advantageously prevented from being chipped, and the tool life can be advantageously improved.

On the other hand, in the case where the diameter of the core leaving portion is larger than 0.045 times of the outer diameter of the body, the contact area of the tip end portion of the drill with the workpiece is increased, thus increasing the cutting resistance at the time of the cutting process. On the contrary, by setting the diameter of the core leaving portion at not more than 0.045 times of the outer diameter of the body, the contact area of the tip end portion of the drill with the workpiece can be decreased, thus reducing the cutting resistance. As a result, the drill can be advantageously prevented from oscillating, and the processing accuracy can be advantageously improved.

In addition to the effect achieved by the drill described in the first aspect noted above, according to the drill in the fourth aspect of the present invention, an inclined angle of each concave portion formed by a wall face on the rear side in the rotational direction and a face orthogonal to the axis is formed substantially the same as, or smaller than a thinning angle formed by the thinning and the face orthogonal to the axis. Accordingly, the chips can be advantageously and smoothly discharged from the concave portions, and at the same time, the strength of each thinning edge can be advantageously secured.

Specifically, in the case where the inclined angle of each concave portion is formed substantially the same as the thinning angle, no steps are formed at the boundary between the concave portion and the thinning, and the concave portion and the thinning are smoothly provided in conjunction with each other. Thus, when the chips accommodated in the concave portions are discharged therefrom, they can be smoothly discharged from the concave portions without being stuck at the boundary between the concave portion and the thinning. As a result, the discharging property of the chips can be advantageously improved.

On the other hand, in the case where the inclined angle of each concave portion is formed smaller than the thinning angle, the inclined angle of each concave portion can be prevented from being unnecessarily large along with the angle of the thinning angle, so that the strength of each thinning edge can be secured. As a result, the tool life can be advantageously improved.

In addition to the effect achieved by the drill in the first aspect noted above, according to the drill in the fifth aspect of the present invention, since there are provided three or more cutting edges by which the thinning edges are relatively packed around the axis portion of the drill in comparison to the case where two cutting edges are provided, the chips are effectively prevented from being stuck around the axis portion by the concave portions and the discharging property of the chips can be advantageously improved in comparison to the case where two cutting edges are provided.

BRIEF DESCRIPTION OF THE DRAWINGS

FIG. 3 is graphs showing the result of a cutting test.

Figure 1:
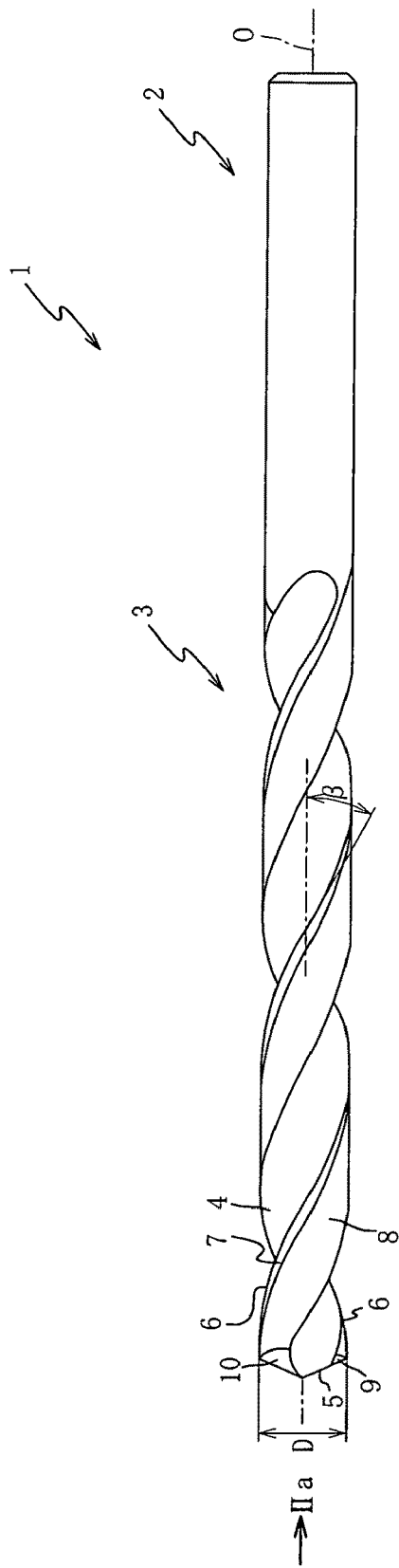
FIG. 1 is a side view of a drill according to an embodiment of the present invention.

DESCRIPTION OF REFERENCE NUMERALS AND SYMBOLS 1 drill
3 body
5 cutting edge
10 thinning
11 thinning edge
12 concave portion
13 core leaving portion
A rotational direction
D outer diameter of body
O axis
X diameter of core leaving portion
α inclined angle
γ thinning angle

BEST MODE FOR CARRYING OUT THE INVENTION

Hereinafter, a preferred embodiment of the present invention will be described with reference to the accompanying drawings. FIG. 1 is a side view of a drill 1 according to an embodiment of the present invention.

First, a schematic configuration of the drill 1 will be described with reference to FIG. 1. The drill 1 is a cutter for performing a drilling process on a workpiece by the torque that is transmitted from a processing machine such as a machining center. As shown in FIG. 1, the drill 1 is configured as a solid drill made of cemented carbide that is obtained by pressure sintering of tungsten carbide (WC) and the like, and mainly includes a shank 2 and a body 3 that is integrally molded with the shank 2.

The drill 1 is configured by using cemented carbide in the embodiment, but the material thereof is not necessarily limited thereto. The drill 1 may be configured by using, for example, high-speed tool steel.

The shank 2 is a portion held by the processing machine, is configured in a columnar shape having substantially the same diameter as that of the body 3, and is provided on the same axis O as that of the body 3, as shown in FIG. 1. Holding of the shank 2 with a holder (not shown) allows the drill 1 to be attached to the processing machine.

It should be noted that the shank 2 is configured in a columnar shape having substantially the same diameter as that of the body 3 in the embodiment, but the configuration is not necessarily limited thereto. For example, the shank 2 may be larger in diameter than the body 3, or may be configured in a taper shape in which the diameter of the shank 2 is decreased toward the end portion side (the upper side in FIG. 1) of the drill 1.

The body 3 is a portion for performing a cutting process while being rotated by the torque that is transmitted from the processing machine through the shank 2. The body 3 is configured in a columnar shape having an outer diameter D that is substantially the same as that of a hole that is made by drilling a workpiece (not shown), and mainly includes grooves 4 and cutting edges 5, as shown in FIG. 1. It should be noted that the outer diameter D of the body 3 is 6.8 mm in the embodiment.

Each groove 4 configures a rake face of the cutting edge 5, and is a portion for accommodating and discharging chips produced at the time of the cutting process. Three grooves 4 are provided in a spiral and concave manner on the outer circumferential face of the body 3, and are provided at substantially-equal angular intervals with respect to the axis of the drill 1, as shown in FIG. 1.

It should be noted that each groove 4 is configured in a spiral manner with a helix in the embodiment, but the configuration is not necessarily limited thereto. Each groove 4 may be configured in a linear manner substantially in parallel with the axis O of the drill 1.

Figure 2A:
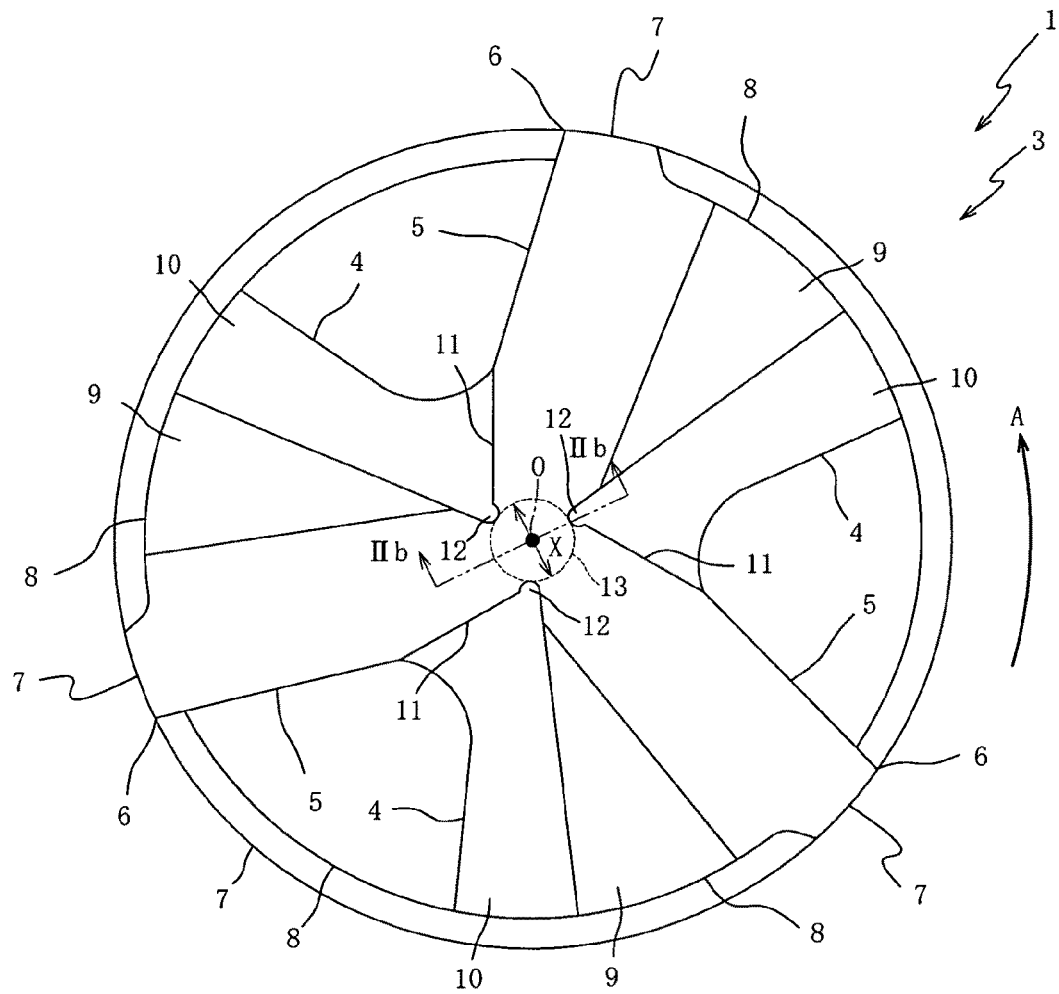
FIG. 2(a) is a front view of the drill when viewed from the direction of the arrow II in FIG. 1.

Further, a leading edge 6 is formed in each ridge portion where the outer circumferential face of the body 3 intersects with a wall face of the groove 4 on the rear side in the rotational direction (see the direction of the arrow A in FIG. 2(a)) as shown in FIG. 1. Each leading edge 6 is provided such that a helix angle β formed by the leading edge 6 and the axis O of the drill 1 is set at 29 degrees, as shown in FIG. 1.

Furthermore, a margin 7 is provided in each leading edge 6 on the rear side in the rotational direction (see the direction of the arrow A in FIG. 2(a)) while being in conjunction with each leading edge 6 as shown in FIG. 1. Each margin 7 is used for grinding an inner wall face of a hole that is made by drilling the workpiece, and is formed by removing the outer circumferential face of the body 3 and then by providing a relieving face 8.

Each cutting edge 5 is used for cutting the workpiece while being rotated by the torque that is transmitted from the processing machine. Three cutting edges 5 are formed in ridge portions where the tip end portion of the drill 1 intersects with the grooves 4, and are provided at substantially-equal angular intervals with respect to the axis O of the drill 1, as shown in FIG. 1. Further, each cutting edge 5 is formed in a substantially linear manner when viewed from the tip end direction of the drill 1 (see FIG. 2(a)).

Next, a detailed configuration of the tip end portion of the body 3 will be described with reference to FIG. 2. FIG. 2(a) is a front view of the drill 1 when viewed from the direction of the arrow IIa in FIG. 1, and FIG. 2(b) is an enlarged sectional view of the drill 1 taken along the line IIb-IIb in FIG. 2(a). It should be noted that the arrow A in FIG. 2(a) indicates the rotational direction of the drill 1.

As shown in FIG. 2(a), flanks 9 and thinnings 10 are mainly provided at the tip end portion of the drill 1. Each flank 9 is used for reducing the cutting resistance by decreasing a contact area of the tip end portion of the drill 1 with the workpiece at the time of the cutting process. Each flank 9 is formed by removing the tip end portion of the drill 1, and at the same time, is provided in conjunction with each cutting edge 5 on the rear side in the rotational direction A, as shown in FIG. 2(a). Thereby, clearances are generated between the tip end portion of the drill 1 and the workpiece at the time of the cutting process, and friction between the drill 1 and the workpiece is accordingly decreased so as to reduce the cutting resistance.

It should be noted that three flanks 9 are provided in a concave manner while corresponding to three cutting edges 5, and are provided at substantially-equal angular intervals with respect to the axis O of the drill 1, as shown in FIG. 2(a), in the embodiment.

Further, each thinning 10 is provided in conjunction with the flank 9 on the rear side in the rotational direction A while extending up to a portion where the thinning 10 intersects with the groove 4, as shown in FIG. 2(a). Each thinning 10 is used for synergistically reducing the cutting resistance in combination with the flank 9, and is formed by removing the tip end portion of the drill 1 deeper than the flank 9, as shown in FIG. 2(a).

It should be noted that three thinnings 10 are provided in a concave manner while corresponding to three flanks 9, and are provided at substantially-equal angular intervals with respect to the axis O of the drill 1, as shown in FIG. 2(a), in the embodiment.

Further, by providing each thinning 10 at the tip end portion of the drill 1, a thinning edge 11 is formed at the tip end portion of the drill 1 nearer the axis O of the drill 1 while being in conjunction with each cutting edge 5, as shown in FIG. 2(a). As similar to the cutting edges 5, each thinning edge 11 is used for cutting the workpiece while being rotated by the torque that is transmitted from the processing machine. Three thinning edges 11 are formed while corresponding to three thinnings 10, and are provided at substantially-equal angular intervals with respect to the axis O of the drill 1, as shown in FIG. 2(a).

Further, a concave portion 12 is provided at an end portion of each thinning edge 11 nearer the axis O of the drill 1, and three concave portions 12 are provided while corresponding to three thinning edges 11, as shown in FIG. 2(a).

Each concave portion 12 is used for accommodating and discharging the chips produced at the time of the cutting process, and is formed in such a manner that each thinning edge 11 is cut to be recessed in a semicircular shape toward the rear side in the rotational direction A, when viewed from the tip end direction of the drill 1, as shown in FIG. 2(a). The radius of each concave portion 12 is set at 7.5% of the length of each thinning edge 11. Specifically, each concave portion 12 occupies 15% of the length of each thinning edge 11, and is formed in such a manner that each thinning edge 11 is cut to be recessed toward the rear side in the rotational direction A by 7.5% of the length of each thinning edge 11. Although the radius of each concave portion 12 is set at 7.5% of the length of each thinning edge 11 in the embodiment, the value is not necessarily limited thereto. It is desirable that the radius of each concave portion 12 is set in a range of not less than 5% and not more than 10% of the length of each thinning edge 11.

Specifically, in the case where the radius of each concave portion 12 is smaller than 5% of the length of each thinning edge 11, the accommodating property and discharging property of the chips by the concave portions 12 are deteriorated due to the small size of each concave portion 12. On the contrary, by setting the radius of each concave portion 12 at not less than 5% of the length of each thinning edge 11, the size of each concave portion 12 can be secured, so that the accommodating property and discharging property of the chips can be improved.

On the other hand, in the case where the radius of each concave portion 12 is larger than 10% of the length of each thinning edge 11, an occupying ratio of the concave portion 12 to the thinning edge 11 becomes large, resulting in reduction in strength of each thinning edge 11. On the contrary, by setting the radius of each concave portion 12 at not more than 10% of the length of each thinning edge 11, the strength of each thinning edge 11 can be secured while preventing the size of each concave portion 12 from being unnecessarily large. As a result, the tool life can be improved.

Further, each concave portion 12 is provided in such a manner that an outer circumferential portion of the semicircular shape of each concave portion 12 is brought into contact with a core leaving portion 13 in a circular shape with the axis O of the drill 1 as its center, when viewed from the tip end direction of the drill 1, as shown in FIG. 2(a).

The core leaving portion 13 is a portion where edges for cutting the workpiece such as the cutting edges 5 and the thinning edges 11 are not formed, and a diameter X of the core leaving portion 13 is set at 0.25 mm, when viewed from the tip end direction of the drill 1, as shown in FIG. 2(a). Although the diameter X of the core leaving portion 13 is set at 0.25 mm in the embodiment, the value is not necessarily limited thereto. The diameter X of the core leaving portion 13 may be set in a range of not less than 0.030 times and not more than 0.045 times of an outer diameter D of the drill 1.

Specifically, in the case where the diameter X of the core leaving portion 13 is smaller than 0.030 times of the outer diameter D of the body 3, each concave portion 12 enters nearer the axis O of the drill 1, resulting in reduction in strength of each thinning edge 11. On the contrary, by setting the diameter X of the core leaving portion 13 at not less than 0.030 times of the outer diameter D of the body 3, each concave portion 12 can be prevented from unnecessarily entering nearer the axis O of the drill 1, so that the strength of each thinning edge 11 can be secured. As a result, the thinning edges 11 can be prevented from being chipped, and the tool life can be improved.

On the other hand, in the case where the diameter X of the core leaving portion 13 is larger than 0.045 times of the outer diameter D of the body 3, the contact area of the tip end portion of the drill 1 with the workpiece is increased, thus increasing the cutting resistance at the time of the cutting process. On the contrary, by setting the diameter X of the core leaving portion 13 at not more than 0.045 times of the outer diameter D of the body 3, the contact area of the tip end portion of the drill 1 with the workpiece can be decreased, thus reducing the cutting resistance. As a result, the drill 1 can be prevented from oscillating, and the processing accuracy can be improved.

Figure 2B:
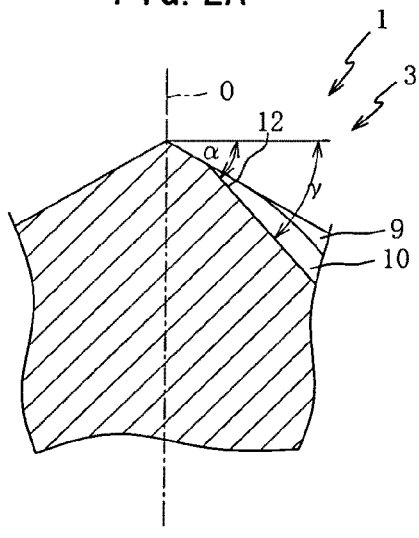
FIG. 2(b) is an enlarged sectional view of the drill taken along the line IIb-IIb in FIG. 2(a).

Further, an inclined angle α of each concave portion 12 formed by a wall face on the rear side in the rotational direction A (see FIG. 2(a)) and a face orthogonal to the axis O of the drill 1 is formed substantially the same as a thinning angle γ formed by the thinning 10 and the face orthogonal to the axis O of the drill 1, as shown in FIG. 2(b). Accordingly, no steps are formed at the boundary between the concave portion 12 and the thinning 10, and the concave portion 12 and the thinning 10 are smoothly provided in conjunction with each other, as shown in FIG. 2(b).

Thus, when the chips accommodated in the concave portions 12 are discharged therefrom, they can be smoothly discharged from the concave portions 12 without being stuck at the boundary between the concave portion 12 and the thinning 10. As a result, the discharging property of the chips can be improved. It should be noted that each of the inclined angle α of each concave portion 12 and the thinning angle γ of each thinning 10 is configured to be 60 degrees in the embodiment.

Next, there will be described a cutting test and an endurance test conducted by using the drill 1 which is configured as described above. The cutting test is a test in which when a drilling process is performed on a workpiece by the drill 1 under a predetermined cutting condition, the component force of the cutting resistance applied on the drill 1 in the direction of the axis O (the left-right direction in FIG. 1), that is, the thrust resistance is measured. Further, the endurance test is a test in which when the drilling process is performed on the workpiece by the drill 1 under the predetermined cutting condition as similar to the cutting test, a total number of holes which can be continuously processed is measured.

It should be noted that the followings are the detailed specification of the cutting test and the endurance test. Workpiece: JIS-S50C, Machine used: horizontal machining center, Cutting fluid: water-miscible cutting fluid, Cutting speed: 80 m/min, Feed speed: 1535 mm/min, Processing depth: 20 mm (blind hole)

The cutting test and the endurance test were conducted by using the drill 1 (hereinafter, referred to as "invention") as described in the embodiment and a drill (hereinafter, referred to as "conventional product") in which constituent elements corresponding to the concave portions 12 of the drill 1 are not provided. It should be noted that the invention is different from the conventional product only in provision of the concave portions 12, and other configurations are the same.

Figure 3A:
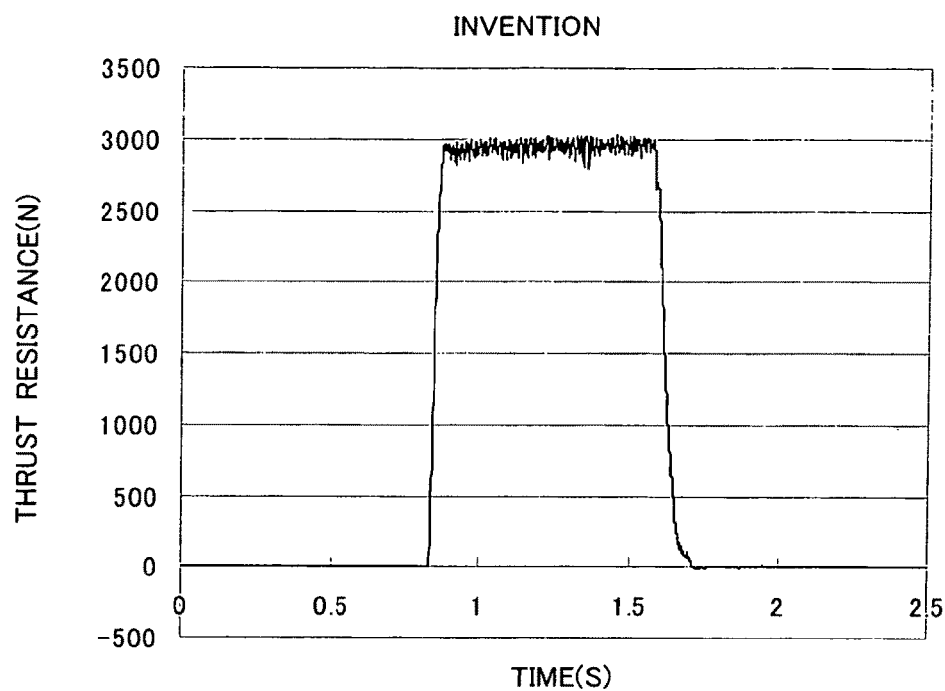
FIG. 3(a) is a graph showing a thrust resistance in the invention.
Figure 3B:
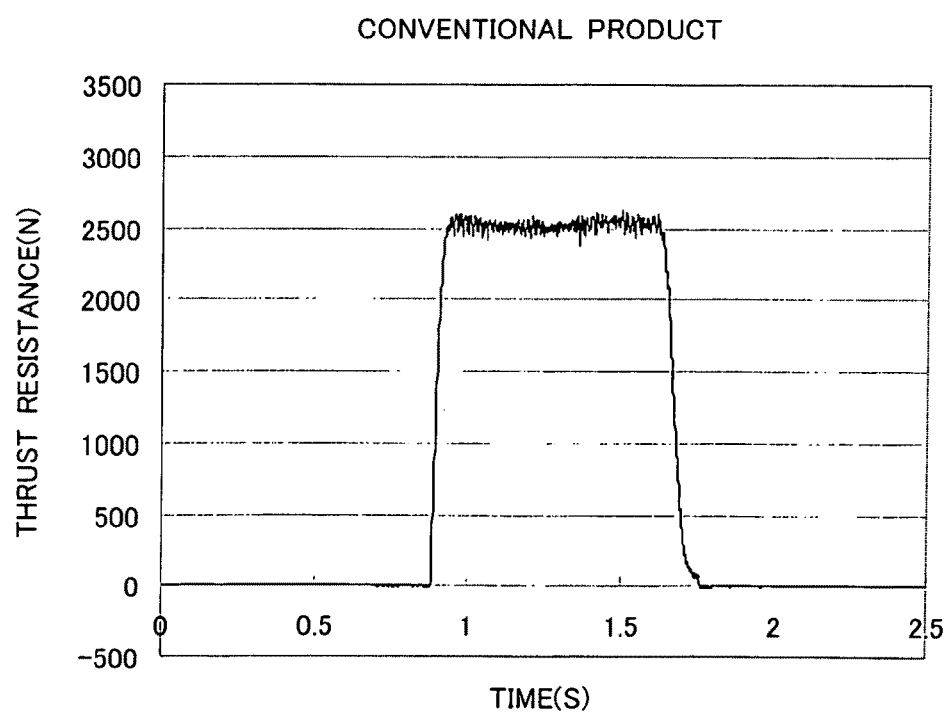
FIG. 3(b) is a graph showing a thrust resistance in a conventional product.
Figure 4:
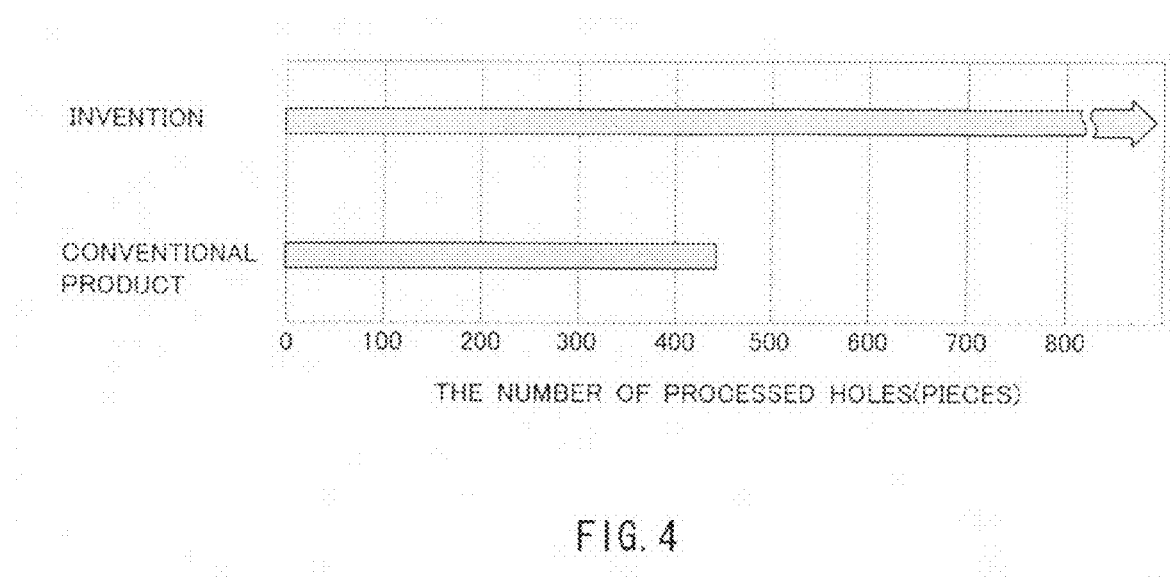
FIG. 4 is a graph showing the result of an endurance test.

Here, there will be described the results of the cutting test and the endurance test with reference to FIGS. 3 and 4. FIG. 3 is graphs showing the result of the cutting test. FIG. 3(a) is a graph showing the thrust resistance in the conventional product, and FIG. 3(b) is a graph showing the thrust resistance in the invention. FIG. 4 is a graph showing the result of the endurance test.

According to the result of the cutting test, it can be readily understood that the thrust resistance could be reduced in the invention in comparison to the conventional product as shown in FIGS. 3(a) and 3(b). Specifically, the average value of the thrust resistance in the invention was 2518N whereas that of the thrust resistance in the conventional product was 2910N.

Since the chips produced at the time of the cutting process were not smoothly discharged in the conventional product, the chips were likely to be stuck around the axis portion of the drill, thus increasing the cutting resistance. On the contrary, the chips were smoothly discharged through the concave portions 12 and the discharging property of the chips was improved in the invention, thus reducing the cutting resistance.

Further, according to the result of the endurance test, it can be readily understood that a total number of holes which can be continuously processed could be increased in the invention in comparison to the conventional product as shown in FIG. 4, that is, the tool life could be improved. Specifically, it was still possible to perform the cutting process even at the time the number of processed holes reached 800 in the invention whereas it was impossible to perform the cutting process due to the breakage and damage of the drill at the time the number of processed holes reached 450 in the conventional product. It should be noted that the arrow in FIG. 4 shows that it was still possible to perform the cutting process even at the time the number of processed holes reached 800 in the test result of the invention.

Since the chips produced at the time of the cutting process were not smoothly discharged in the conventional product, the chips were likely to be stuck around the axis portion of the drill, and the cutting resistance was increased, thus breaking and damaging the drill. On the contrary, since the chips were smoothly discharged through the concave portions 12 and the discharging property of the chips was improved in the invention, the cutting resistance could be reduced, thus preventing the drill from being broken and damaged.

As described above, according to the drill 1 in the embodiment, each thinning edge 11 is provided with the concave portion 12 formed by cutting each thinning edge 11 to be recessed toward the rear side in the rotational direction (see the direction of the arrow A in FIG. 2(a)), so that the chips produced at the time of the cutting process can be accommodated and discharged by the concave portions 12.

Specifically, since the thinning edges 11 are formed to be tightly packed around the axis O of the drill 1, the chips are accommodated and discharged in/from the portions around the axis O where the chips are likely to be stuck, namely, the concave portions 12 provided at the thinning edges 11, so that it is possible to prevent the chips from being stuck around the axis O and to improve the discharging property of the chips.

In order to prevent the chips from being stuck around the axis O of the drill 1, for example, the thinning amount (the amount by which a tip end portion of the drill is cut into the rear side of the drill along the axis direction) of the thinning 10 is increased, thereby improving the discharging property of the chips. However, the increase of the thinning amount results in reduction in strength of the whole drill 1 in this case, and thus the drill is likely to be broken and damaged, leading to reduction in the tool life.

On the contrary, according to the drill 1 in the embodiment, since the concave portions 12 are formed by cutting the thinning edges 11 to be recessed, it is possible to improve the tool life while improving the discharging property of the chips without reduction in strength of the whole drill 1.

Further, since each concave portion 12 is provided at the end portion of each thinning edge 11 nearer the axis O, the chips are effectively prevented from being stuck at the axis O of the drill 1, by the concave portions 12, where the thinning edges 11 are most tightly packed. Accordingly, it is possible to further improve the discharging property of the chips.

Furthermore, according to the drill 1 in the embodiment, since there are provided three cutting edges 5 by which the thinning edges 11 are relatively packed around the axis O of the drill 1 in comparison to the case where two cutting edges are provided, the chips are effectively prevented from being stuck around the axis O by the concave portions 12 and the discharging property of the chips can be improved in comparison to the case where two cutting edges 5 are provided.

The present invention has been described above based on the embodiment. However, the present invention is not limited to the above-described embodiment in any way, and it can be readily understood that various changes and modifications can be made in a range without departing from the gist of the present invention.

For example, the values given in the embodiment are merely an example, and it is obvious that other values can be employed.

In the embodiment, the case in which three cutting edges 5 are provided has been described. However, the number of cutting edges is not necessarily limited thereto. For example, two cutting edges 5 may be provided. Alternatively, four or more cutting edges 5 may be provided. In the case where four or more cutting edges 5 are provided, the concave portions 12 can effectively prevent the chips from being stuck around the axis O, and the discharging property of the chips can be improved in comparison to the case where two cutting edges 5 are provided, as similar to the drill 1 in the embodiment. Accordingly, it is preferable that three or more cutting edges 5 are provided.

There has been described a case in which three concave portions 12 are provided while corresponding to three thinning edges 11 in the above-described embodiment. However, the invention is not necessarily limited thereto. For example, the concave portion 12 may be provided only at any one of three thinning edges 11. Alternatively, the concave portions 12 may be provided only at any two of three thinning edges 11.

Further, there has been described a case in which each concave portion 12 is formed in an arc shape when viewed from the tip end direction of the drill 1 in the embodiment. However, the invention is not necessarily limited thereto. For example, each concave portion 12 may be formed in a substantially rectangular shape when viewed from the tip end direction of the drill 1. Alternatively, each concave portion 12 may be formed in a substantially triangular shape.

Furthermore, there has been described a case in which the inclined angle α of each concave portion 12 is formed substantially the same as the thinning angle γ. However, the invention is not necessarily limited thereto. The inclined angle α of each concave portion 12 may be formed smaller than the thinning angle γ. In this case, the inclined angle α of each concave portion 12 can be prevented from being unnecessarily large along with the angle of the thinning angle γ, so that the strength of each thinning edge 11 can be secured. As a result, the tool life can be improved.

It should be noted that the statement "when viewed from the tip end direction of the body" recited within the context of the present invention corresponds to that "when viewed from the direction of the arrow II" used with reference to FIG. 1.

The invention claimed is:

1. A drill comprising:
a columnar body which is rotated about an axis;
a plurality of cutting edges, each of which is formed at a tip end portion of the body; and
a plurality of thinning edges, each of which is formed in conjunction with the cutting edge nearer the axis by providing thinnings at the tip end portion of the body;
wherein at least one of the plurality of thinning edges is provided with a concave portion that is formed by cutting the thinning edge to be recessed in a semicircular shape toward the rear side in the rotational direction, and a center of the semicircular-shaped concave portion is provided on a line extended from the tip end portion of the thinning edge when viewed from a tip end direction of the body.

2. The drill according to claim 1, wherein the concave portion is provided at an end portion of each thinning edge nearer the axis.

3. The drill according to claim 2, wherein the concave portion is provided in contact with a core leaving portion in a circular shape with the axis as its center when viewed from the tip end direction of the body, and the diameter of the core leaving portion is set in a range of not less than 0.030 times and not more than 0.045 times of the outer diameter of the body.

4. The drill according to claim 1, wherein an inclined angle of each concave portion formed by a wall face of the concave portion on the rear side in the rotational direction and a face orthogonal to the axis is formed substantially the same as a thinning angle formed by the thinning and the face orthogonal to the axis, or formed smaller than the thinning angle.

5. The drill according to claim 2, wherein an inclined angle of each concave portion formed by a wall face of the concave portion on the rear side in the rotational direction and a face orthogonal to the axis is formed substantially the same as a thinning angle formed by the thinning and the face orthogonal to the axis, or formed smaller than the thinning angle.

6. The drill according to claim 3, wherein an inclined angle of each concave portion formed by a wall face of the concave portion on the rear side in the rotational direction and a face orthogonal to the axis is formed substantially the same as a thinning angle formed by the thinning and the face orthogonal to the axis, or formed smaller than the thinning angle.

7. The drill according to claim 6, wherein three or more cutting edges are provided.

* * * * *